United States Patent [19]

Kondoh et al.

[11] Patent Number: 4,656,629

[45] Date of Patent: Apr. 7, 1987

[54] DIGITAL SIGNAL TRANSMITTING AND/OR RECEIVING SYSTEM

[75] Inventors: Yoshiyuki Kondoh; Takanobu Ishidoh, both of Tokyo, Japan

[73] Assignee: Sony Corporation, Tokyo, Japan

[21] Appl. No.: 668,794

[22] Filed: Nov. 6, 1984

[30] Foreign Application Priority Data

Nov. 9, 1983 [JP] Japan ............................. 58-210356

[51] Int. Cl.⁴ ................... H04J 3/02; H04J 3/12; H04H 1/00; H04N 1/00
[52] U.S. Cl. .................................. 370/85; 370/110.1; 455/4; 455/6; 358/86; 358/143
[58] Field of Search ..................... 370/85, 110.2, 110.3, 370/110.1; 455/4, 6; 358/86, 141, 142, 143, 145

[56] References Cited

U.S. PATENT DOCUMENTS

| | | | |
|---|---|---|---|
| 3,889,051 | 6/1975 | Legler | 358/142 |
| 4,061,577 | 12/1977 | Bell | 358/142 |
| 4,390,901 | 6/1983 | Keiser | 358/142 |
| 4,461,032 | 7/1984 | Skerlos | 455/4 |
| 4,535,454 | 8/1985 | Buzzard et al. | 370/110.3 |
| 4,542,406 | 9/1985 | Shimoyama et al. | 358/142 |
| 4,544,950 | 10/1985 | Tu | 358/143 |
| 4,550,400 | 10/1985 | Henderson, Jr. et al. | 370/85 |
| 4,554,658 | 11/1985 | Marten et al. | 370/110.2 |

*Primary Examiner*—Douglas W. Olms
*Assistant Examiner*—Frank M. Scutch, III
*Attorney, Agent, or Firm*—Lewis H. Eslinger; Alvin Sinderbrand

[57] ABSTRACT

A digital signal transmitting system includes a signal generator for producing time division-multiplexed digital audio signals and service bit signals, a modulator for modulating a carrier in accordance with the time division-multiplexed signals and a transmitter to transmit the modulated carrier through a CATV (cable television) transmission line. In a receiver, the service bit signals are decoded so as to control the channel changeover of a television receiver when an emergency broadcast signal is transmitted. A muting control circuit is also provided so as to mute an audio signal from a D/A (digital-to-analog) converter.

7 Claims, 16 Drawing Figures

FIG. 1C A Mode
FIG. 1D B Mode
FIG. 1E C Mode
FIG. 1F D Mode

FIG. 2
| Channel | Mode | and Service | Contract | |
|---|---|---|---|---|
| CH A | A Mode | 16 Bit Stereo Broadcast | | 0 Free Charge |
| CH B | A Mode | 16 Bit Stereo Broadcast | | 1 Charge |
| CH C | B Mode | 8 Bit Stereo Broadcast | | 0 Free Charge |
| | | 8 Bit Stereo Broadcast | | 1 Charge |
| CH D | C Mode | 8 Bit Monaural Broadcast | M1 M2 M3 M4 | Charge 1 |
| | | Emergency Broadcast | | 0 Free Charge |
| | | Announce Broadcast | | 0 Free Charge |
| | | Facsimile | | 1 Charge |
| | | Game | | 1 Charge |
FIG. 6A
Pa
FIG. 6B
Pb
FIG. 6C
SB
FIG. 6D
Pd
FIG. 6E
Pe
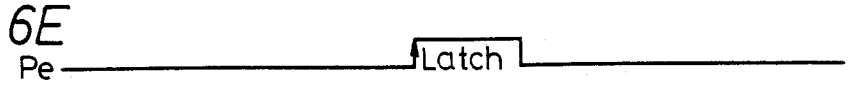

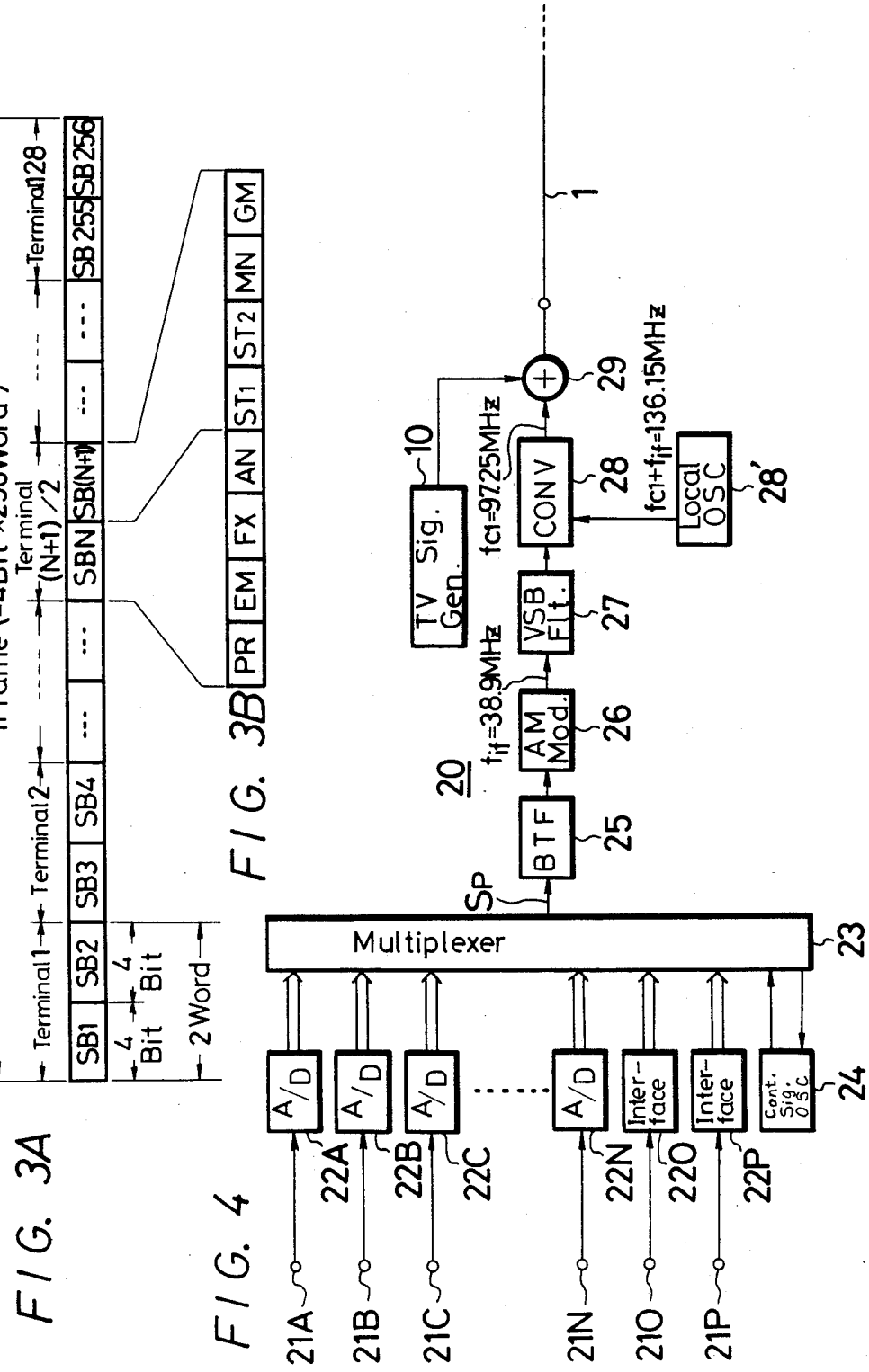

DIGITAL SIGNAL TRANSMITTING AND/OR RECEIVING SYSTEM

BACKGROUND OF THE INVENTION

1. Field of the Invention

This invention relates to a digital signal transmitting and/or receiving system and more particularly is directed to a digital signal transmitting system for transmitting a digital signal, which results from A/D (analog-to-digital)converting a stereo signal or emergency broadcast signal, through a CATV (cable television) transmission line.

2. Description of the Prior Art

A system has been proposed in the art in which time division-multiplexed digital audio signals of a plurality of channels are transmitted by using a vacant channel of a CATV transmission line. According to such transmission system, a stereo broadcast of high quality having a wide dynamic range or emergency broadcast becomes possible. In this case, in order to discriminate whether the broadcast is the stereo broadcast or emergency broadcast, a mode change-over signal is time division-multiplexed with a word synchronizing signal and a digital audio signal as a 4-bit service bit signal and then transmitted. At a receiver side, the service bit signal is decoded and used as a control signal for controlling a playback mode of a desired digital audio signal.

However, upon emergency broadcast, although it is desired that a power source of a television receiver is turned on, a receiving channel of the television receiver is changed over into an emergency broadcast channel and the emergency broadcast is received by the television receiver, such system has not yet been proposed.

OBJECTS AND SUMMARY OF THE INVENTION

Accordingly, an object of this invention is to provide a digital signal transmitting system which can obviate the above defects.

Another object of this invention is to provide a digital signal transmitting system capable of transmitting a digital audio signal and a service bit signal through one channel of a CATV (cable television) and in which by detecting that a signal level of a predetermined bit of the service bit signal becomes high upon emergency broadcast, the power source of a television receiver is turned on and a receiving channel thereof is changed over into a desired channel.

According to one aspect of this invention, there is provided a digital signal transmitting system comprising:
 (a) means for generating a word synchronizing signal;
 (b) means for generating digital audio signals sampled at a sampling frequency and coded in a predetermined data length;
 (c) means for generating service bit signals to control an operation of a receiver;
 (d) means for multiplexing said word synchronizing signal, digital audio signals and service bit signal so as to produce a digital word signal; and
 (e) means for modulating a carrier in accordance with said digital word signal and transmitting the modulated carrier through a transmission line.

According to another aspect of this invention, there is provided a digital signal receiving system comprising:
 (a) a signal input terminal for receiving a modulated carrier modulated by a time-multiplexed word synchronizing signal, digital audio signals and service bit signals;
 (b) means for demodulating said time division-multiplexed word synchronizing signal, digital audio signals and service bit signals;
 (c) means for D/A (digital-to-analog)-converting said digital audio signals into analog signals which are supplied to a loudspeaker through an audio amplifier;
 (d) a television receiver connected to said signal input terminal so as to receive a plurality of channels;
 (e) means for latching said service bit signals; and
 (f) control means connected to said latching means so as to produce a control signal which is supplied to said television receiver.

The other objects, features and advantages of the present invention will become apparent from the following description taken in conjunction with the accompanying drawings through which the like references designate the same elements and parts.

BRIEF DESCRIPTION OF THE DRAWINGS

FIGS. 1A to 1F are respectively diagrams illustrating a format of a digital signal used in the present invention;

FIG. 2 is a table showing an example in which a different broadcast program is transmitted at each channel;

FIGS. 3A and 3B are respectively diagrams showing an example of a format of a service bit signal used in the present invention;

FIG. 4 is a circuit block diagram showing an example of a CATV (cable television) center used in this invention;

FIGS. 6A to 6E are respectively waveform diagrams showing the latch operation of a service bit signal of the present invention.

DESCRIPTION OF THE PREFERRED EMBODIMENTS

Now, the present invention will hereinafter be described with reference to the drawings.

In this invention, digital data of a plurality of channels and a service bit data for controlling a receiver terminal both of which will be transmitted through a CATV (cable television) line are transmitted in the form of signal formats as, for example, shown in FIGS. 1A to 1F.

Figures 1A, 1B:
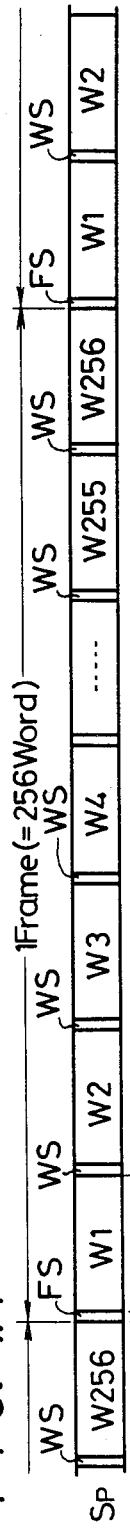

That is, the data signal is a binary signal including a number of frames as shown in FIG. 1A. One frame thereof is formed of 256 words, W1 to W256 and one word thereof is formed of 168 bits, the cycle thereof being 1/44.1 kHz as shown in FIG. 1B. Each word includes a synchronizing code signal SYNC of 8 bits, a service bit signal SB of 4 bits, data bit signals CHA to CHD of 4 channels, each channel formed of 32 bits and an error correction code signal ECC of 7 bits $\times$ 4 in turn.

In this case, as shown in FIG. 1A, the synchronizing code signal SYNC is made as a frame synchronizing signal FS in the word W1 which is the beginning of one frame and as a word synchronizing signal WS in the other 255 words, W2 to W256 and the bit patterns of the frame synchronizing signal FS and the word synchronizing signal WS are made different from each other.

The service bit signal SB is used as a unit of one frame, namely, $4 \times 256 = 1024$ bits to indicate an address signal for each terminal, a content of service for the terminal, for example, the permission for receiving the pay channel audio broadcast and so on. If of service bit signals SB of one unit (1024 bits), for example, 21 bits are used for addressing the terminals, it is possible to address $2^{21} \approx 2.1$ million terminals.

The data bit signals CHA to CHD are each formed of 32 bits and construct 4 independent channels CHA to CHD, respectively.

Each of the channels CHA to CHD can adopt any one of modes A to D which are shown in FIGS. 1C to 1F.

In the mode A, as shown in FIG. 1C, left and right channel stereo audio signals L and R are sampled by a sampling frequency of 44.1 kHz and encoded to PCM signals of 16 bits each. The signal format of these PCM signals corresponds to the same signal format of a DAD (digital audio disc) in a so-called CD (compact disc) system. Accordingly, the mode A can provide the stereo audio signal of extremely high quality.

In the mode B, as shown in FIG. 1D, two pairs of stereo signals $L_1$, $R_1$ and $L_2$, $R_2$ are respectively sampled by the frequency of 44.1 kHz and then encoded to PCM signals of 8 bits, respectively. In the mode B, the reduction for the noise caused by expanding and compressing in level the audio signals $L_1$ to $R_2$ is carried out, too. Consequently, in accordance with the mode B, it is possible to provide the stereo broadcasting of high quality in two different channels.

In the mode C, as shown in FIG. 1E, monaural signals $M_1$ to $M_8$ channels are sampled by a frequency of 22.05 kHz and then respectively encoded to PCM signals of 8 bits. In this case, in accordance with the use, some of the monaural signals $M_1$ to $M_8$ are used for facsimile and the like. Thus, in this mode C, it is possible to realize services such as news, weather forecast, emergency broadcast, facsimile and so on.

Further, in the mode D, as shown in FIG. 1F, the mode B and the mode C are combined to each other so as to realize one channel so that this mode D can cope with more elaborate service.

The modes A to D and the channels CHA to CHD can freely be combined with one another.

7 bits each of the error correction code ECC are used to carry out the error correction of the channels CHA to CHD and a BCH code, by way of example, can be used as the error correction code ECC.

The PCM signal Sp with the signal format as described above has the transmission bit rate as given by 168 bits×44.1 kHz≈7.4 Mb/s Thus, the PCM signal Sp can be transmitted by using the frequency band of 6 MHz which is the frequency band of one channel in the television broadcast.

By way of example, an explanation will be given on a case in which the channels CHA to CHD are assigned as shown in FIG. 2. In FIG. 2, "free charge" represents the broadcast which can be used (or received) by a fundamental charge of a receiving contract, while "charge" represents the broadcast which can be used only when the additional charge is paid.

In this example, there are provided 128 terminals to which addresses "1" to "128" (terminal numbers) are assigned. The service bit signal SB has the signal format as shown in FIGS. 3A and 3B.

As described above, the service bit signal SB takes 1024 bits for one frame as one unit and includes address information and service information for each terminal. As shown in FIG. 3A, if the service bit signals SB of one frame are sequentially grouped into service bit signals SB1 to SB256, 4 bits of one word being made as one set, the service bit signals SB1 and SB2 indicate the content of the service for a terminal 1 and the service bit signals SB3 and SB4 indicate the content of service for a terminal 2. Accordingly, service bit signals SBN and SB(N+1) (N=1 to 255) indicate the content of service for a terminal (N+1)/2.

The service bit signals SBN and SB(N+1) formed of 8 bits are given with a meaning as, for example, shown in FIG. 3B. That is, assuming that the service bit signals SBN and SB(N+1) are taken as one data, its first bit PR represents a parity bit for the service bit signals SBN and SB(N+1). And, this first bit PR is made to be "0" (digital zero) or "1" (digital one) so as to make the number of the consecutive digital ones of the service bit signals SBN and SB(N+1) even. A second bit EM is a bit indicative of the presence or absence of emergency broadcast and becomes "0" in the absence of emergency broadcast, while it becomes "1" in the presence of emergency broadcast. A third bit FX is a bit which permits the receiving of facsimile and becomes "0" for the terminal having no contract for receiving the facsimile, while it becomes "1" for the terminal having concluded such contract. Further, a fourth bit AN is a bit which indicates the presence or absence of the announce broadcast for each terminal and becomes "0" in the absence of announce broadcast, while it becomes "1" in the presence of announce broadcast.

A fifth bit ST1 is a bit used to permit the reception of a 16-bit stereo broadcast which uses the channel CHB. This fifth bit ST1 becomes "0" for a terminal having no receiving contract, while it becomes "1" for a terminal having concluded a contract for receiving such broadcast. A sixth bit ST2 is a bit used to approve the reception of an 8 bit stereo broadcast which uses the channel CHC. A seventh bit MN is a bit used to approve the reception of monaural broadcast which uses the channel CHD. An eighth bit GM is a bit used to permit the reception of a signal of a computer game which uses the channel CHD. The bits of the sixth bit ST2 to the eighth bit GM become "0" or "1" depending on the absence or presence of the contract similarly to the fifth bit ST1.

FIG. 4 schematically illustrates an example of a CATV center. In FIG. 4, reference numeral 10 generally designates a television signal generator for carrying out an ordinary CATV broadcast. In this television signal generator 10, a television signal of each television channel is generated and the television signal thus generated is supplied to a mixing circuit 29.

Reference numeral 20 designates a transmitter circuit for carrying out the above audio broadcast. In the transmitter circuit 20, stereo signals L and R which are respectively assigned to the channel CHA are respectively supplied through terminals 21A, 21B to A/D (analog-to-digital) converters 22A and 22B, in which they are sampled at a sampling frequency of 44.1 kHz and then converted to PCM signals of 16 bits. These signals are respectively supplied to a multiplexer 23. Audio signals of channels CHB to CHD (3-channel stereo audio signal, 4-channel monaural signal and audio signals for emergency broadcast and announce broadcast) are respectively supplied through terminals 21C to 21N to A/D converters 22C to 22N, in which they are converted to PCM signals of respective standards and then fed to the multiplexer 23, too.

A signal from a facsimile (not shown) and a signal of a computer game are respectively supplied through terminals 21O and 21P to interface circuits 22O and 22P, in which they are converted to PCM signals of standards of mode C. These signals are also supplied to the multiplexer 23.

In a control signal generating circuit 24, the service bit signal SB, the synchronizing code signal SYNC, the error correction code signal ECC and so on corresponding to each terminal are generated and then supplied to the multiplexer 23. Thus, the multiplexer 23 generates the PCM signal Sp which was described in connection with FIGS. 1 to 3.

This signal Sp is supplied through a binary transversal filter 25, which serves to reduce the inter symbol interference to an AM (amplitude modulation)-modulator 26 and then modulated to an intermediate frequency signal (intermediate frequency is 38.9 MHz, for example). This intermediate frequency signal is supplied to a VSB (vestigial side band)-filter 27 thereby converted to a VSB signal whose occupied band width is 6 MHz, namely, the same as that of the ordinary television signal. This signal is supplied to a frequency converter 28 to which the an oscillation signal is supplied from a local oscillator circuit 28' and then frequency-converted to a television signal with a predetermined carrier, for example, 97.25 MHz. This television signal is delivered through th mixing circuit 29 to a coaxial cable 1.

Figure 5:
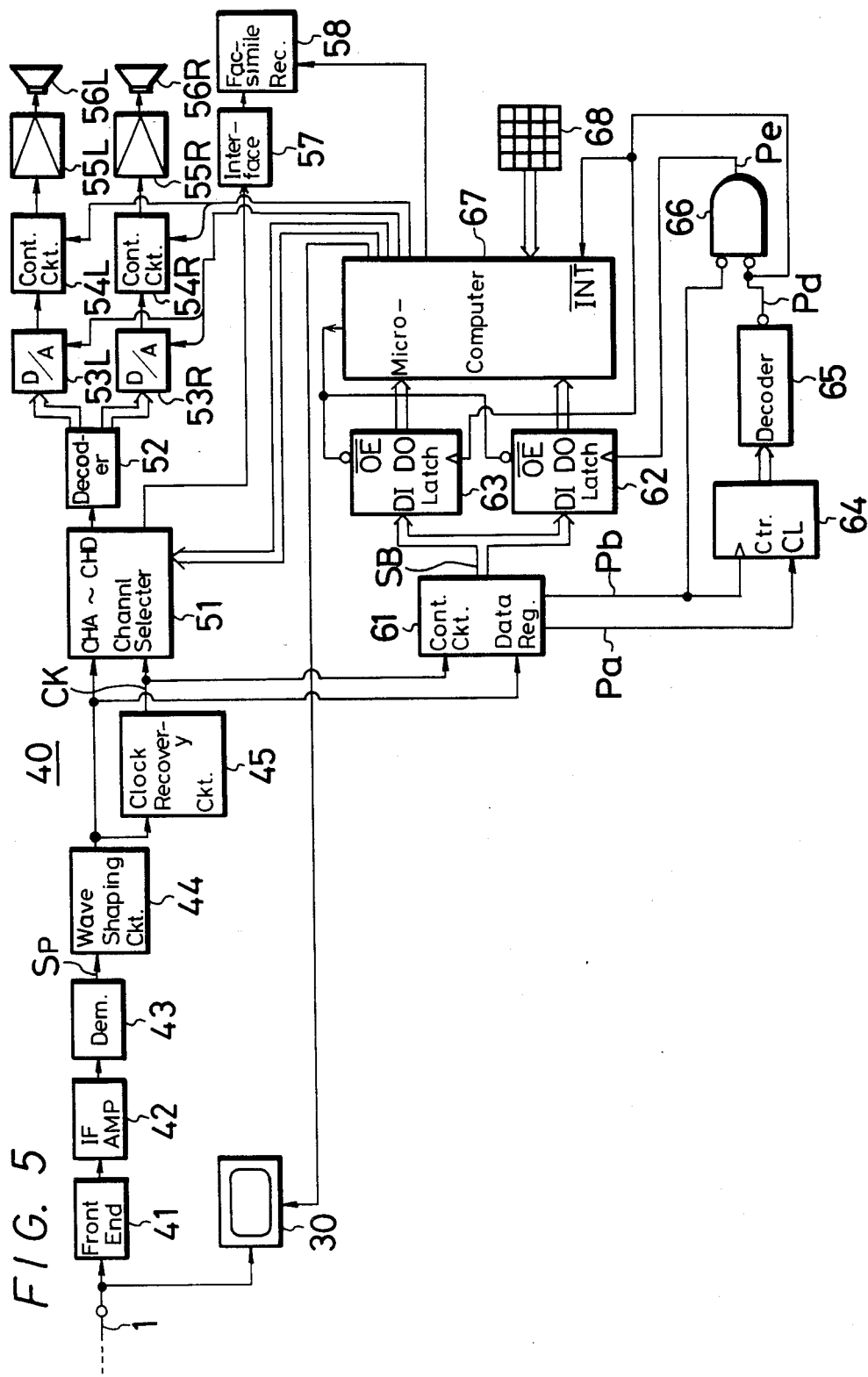
FIG. 5 is a circuit block diagram showing an example of a terminal (receiver) used in this invention.

FIG. 5 schematically illustrates an example of the terminals. In FIG. 5, the address (terminal number) of the terminal is "2" and the terminal has concluded a contract for receiving facsimile.

Reference numeral 30 designates a television receiver for receiving the ordinary CATV broadcast. This television receiver 30 receives the television signal through the coaxial cable 1 to perform the reception of the ordinary CATV braodcast.

Reference numeral 40 generally designates a receiver for receiving the above service broadcast, in which the signal from the coaxial cable 1 is supplied to a front end 41 from which the VSB signal of the PCM signal Sp is derived and in which the signal is converted to an intermediate frequency signal. This intermediate frequency signal is fed through an intermediate frequency amplifier 42 to a demodulator 43 by which the PCM signal Sp is demodulated. This signal Sp is supplied through a wave form shaping circuit 44 to a channel selector 51 and a clock recovery circuit 45 including a PLL (phase locked loop). The clock recovery circuit 45 produces a clock signal CK and supplies this clock signal CK to the channel selector 51.

The signal Sp from the wave form shaping circuit 44 and the clock signal CK from the clock recovery circuit 45 are both supplied to a signal deriving circuit or control circuit and data register circuit 61 which produces a pulse Pa which becomes "1" at every frame synchronizing signal FS as shown by a solid line in FIG. 6A and a pulse Pb which is inverted as shown in FIG. 6B at every word synchronizing signal WS (shown by a broken line in FIG. 6A). Further, as shown in FIG. 6C, the service bit signal SB is derived from the circuit 61 4 bits in parallel during each word period, held until the succeeding word period and hence produced by two-word amount. This service bit signal SB is supplied to 4-bit latch circuits 62 and 63 as data input thereof.

The pulse Pb from the control circuit and data register 61 is supplied to a counter 64 as a count input thereof and the pulse Pa derived from the circuit 61 is supplied to the counter 64 as a clear input thereof. The counted output from the counter 64 is supplied to a decoder 65. Then, derived from the decoder 65 is a decoded output Pd as shown in FIG. 6D. In other words, since the address of the terminal shown in FIG. 5 is "2", the signal Pb becomes "0" when the counted value of the counter 64 is "2". This signal Pd is supplied to the latch circuit 63 as the latch input thereof and the signals Pd, Pb are respectively supplied to an AND circuit 66 of negative logic input, from which an AND output Pe as shown in FIG. 6E is derived. This pulse Pe is supplied to the latch circuit 62 as the latch input thereof. Accordingly, the service bit signal SB 3 at the rising edge of the pulse Pe is latched in the latch circuit 62, while the service bit signal SB 4 at the rising edge of the pulse Pd is latched in the latch circuit 63. In other words, the service bit signals SB 3 and SB 4 corresponding to the terminal shown in FIG. 5 are respectively latched in the latch circuits 62 and 63.

The outputs from the latch circuits 62 and 63 are respectively supplied to port input terminals of a one chip microcomputer 67, and the pulse Pd is supplied to an interrupt input terminal $\overline{INT}$ of the microcomputer 67. Then, in the microcomputer 67, the interrupt is carried out by the pulse Pd. The port output from the microcomputer 67 is supplied to output enable terminals $\overline{OE}$ of the latch circuits 62 and 63 so that the service bit signals SB 3 and SB 4 latched therein are fed to the microcomputer 67. Consequently, on the basis of the first bit PR thereof, the parity check is carried out for the service bit signal and the respective contents of the second bit EM to the eight bit GM are interpreted. Reference numeral 68 designates an input keyboard which is operated by user to specify the broadcast thus transmitted.

From the port output terminal of the microcomputer 67, the selection signal is supplied to the channel selector 51 so that the channel selector 51 produces the PCM signal corresponding to the channel (broadcast) which was specified by the user at the keyboard 68. The PCM signal thus produced is supplied to a decoder 52, in which it is subjected to error correction which then is supplied to D/A (digital-to-analog) converters 53L, 53R and thereby converted to the original audio signals. These audio signals are respectively supplied through control circuits 54L, 54R and amplifiers 55L, 55R to speakers 56L, 56R.

At that time, since the control signal from the microcomputer 67 is supplied to the control circuits 54L and 54R, when the broadcast of the channels CHA and CHC is selected, the level expanding operation (noise reduction) of the control circuits 54L and 54R is turned off, while when the broadcast of the channel CHB is selected, that operation is turned on.

However, in this case, since the fifth bit ST1 to the seventh bit MN of the service bit signals SB3 and SB4 are interpreted in the microcomputer 67, it is identified whether or not the reception of the pay channel broadcast in the channels CHB, CHC and CHD is approved (contracted). If it is not approved, even when the reception of the pay channel broadcast is specified by the keyboard 68, by the fact that the corresponding channel is not selected by the channel selector 51, the specifying for the reception of the pay channel broadcast is neglected.

In the terminal shown in FIG. 5, the contract for receiving facsimile is concluded by the user. The presence of such receiving contract is identified from the third bit FX of the service bit signals SB3 and SB4 by the microcomputer 67, the channel selector 51 is controlled, a facsimile signal is supplied from the channel selector 51 to an interface circuit 57 and a facsimile receiver 58, and the power source of the facsimile receiver 58 is turned on by the port output of the microcomputer 67.

Upon emergency broadcast, the microcomputer 67 identifies whether or not the second bit EM of the service bit signals SB3 and SB4 becomes "1". When the bit EM is "1", on the basis of the port output of the microcomputer 67, the power source of the television receiver 30 is turned on and its receiving channel is changed over to the emergency broadcast channel, the picture image for the emergency broadcast being received.

Further, upon receiving the emergency broadcast, it may be possible that on the basis of the control signal from the microcomputer 67, the control circuits 54L and 54R are operated so as to mute the audio signal with the result that only the television receiver 30 becomes operative.

As set forth above, according to this invention, it is possible to transmit various informations including the PCM audio signal of high quality to each terminal. Also, by the service specifying function which uses the service bit signal SB, it is possible to specify the content of service for each terminal, and thus elaborate service can be realized.

Further, upon emergency, the muting operation is effected so as to stop all terminals from reproducing the music program broadcast and so on so that the emergency broadcast can dominantly be carried out.

Furthermore, the same control operation can be carried out simultaneously for all the terminals or every group of the terminals. In addition, the above action and effect can be achieved by the band width of one channel which uses, for example, the vacant channel of the existing CATV transmission line.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A digital signal transmitting system comprising:
 means for generating a word synchronizing signal;
 means for generating digital audio signals sampled at a sampling frequency and coded in a predetermined data length;
 means for generating service bit signals including an identifying signal indicating that an emergency broadcast signal is being transmitted;
 means for mutiplexing said word synchronizing signal, digital audio signals and service bit signals so as to produce a digital word signal;
 a cable television transmission line; and
 means for modulating a carrier in accordance with said digital word signal and transmitting the modulated carrier through said cable television transmission line.

2. A digital signal transmitting system according to claim 1, in which said digital audio signals include at least a 2 channel stereo broadcast signal and an emergency broadcast signal.

3. A digital signal receiver comprising:
 a signal input terminal for receiving a modulated carrier modulated by a time-multiplexed word synchronizing signal, digital audio signals and service bit signals, said service bit signals including an identifying signal indicating than an emergency broadcast signal is being transmitted;
 means for demodulating said time division-multiplexed word synchronizing signal, digital audio signals and service bit signals;
 a speaker,
 an audio amplifier connected to said speaker;
 means for digital-to-analog-converting said digital audio signals into analog signals which are supplied a said speaker through said audio amplifier;
 a television receiver connected to said signal input terminal so as to receive a plurality of channels;
 means for latching said service bit signals; and
 control means connected to said latching means so as to produce a control signal which is supplied to said television receiver to turn on said television receiver when said identifying signal is received.

4. A receiver according to claim 3, in which the channel of said television receiver is changed over by said control signal from said control means to receive a predetermined channel.

5. A receiver according to claim 4, in which said predetermined channel receives said emergency broadcast signal.

6. A receiver according to claim 3, in which said control means comprises a microcomputer.

7. A receiver according to claim 3, in which said control means produces a muting control signal which is used to prevent an analog signal from being transmitted to said speaker.

* * * * *